United States Patent
Brown et al.

(10) Patent No.: US 6,276,375 B1
(45) Date of Patent: Aug. 21, 2001

(54) APPARATUS AND METHODS FOR WASHING CORES OF CORED LETTUCE HEADS

(75) Inventors: Richard S. Brown, Chualar; Eugene D. Rizzo, Pacific Grove, both of CA (US)

(73) Assignee: Fresh Express, Inc., Salinas, CA (US)

( * ) Notice: Subject to any disclaimer, the term of this patent is extended or adjusted under 35 U.S.C. 154(b) by 0 days.

(21) Appl. No.: 09/144,792

(22) Filed: Sep. 1, 1998

(51) Int. Cl.[7] .................................................. B08B 3/02
(52) U.S. Cl. .................. 134/82; 134/169 R; 134/168 R; 134/135
(58) Field of Search ............................. 134/168 R, 169 R, 134/137, 198, 152, 153, 157, 135, 82

(56) References Cited

U.S. PATENT DOCUMENTS

| | | |
|---|---|---|
| 910,882 | 1/1909 | Truesdell . |
| 1,661,602 | 3/1928 | Dary . |
| 2,003,326 | 6/1935 | Wellman . |
| 2,170,378 | 8/1939 | Orstrom . |
| 2,214,944 | 9/1940 | Vogt . |
| 2,294,668 | 9/1942 | Karas . |
| 2,335,913 | 12/1943 | Buttery . |
| 2,424,693 | 7/1947 | Jones . |
| 2,611,709 | 9/1952 | Plagge . |
| 2,627,862 | 2/1953 | Flusher . |
| 2,815,621 | 12/1957 | Carter . |
| 2,920,967 | 1/1960 | Heinemann . |
| 2,925,210 | 2/1960 | Fallert . |
| 2,955,940 | 10/1960 | Williams . |
| 2,967,777 | 1/1961 | Grindrod . |
| 3,055,568 | 9/1962 | Zalking . |
| 3,128,934 | 4/1964 | Jacke . |
| 3,203,437 | 8/1965 | Faust . |
| 3,204,825 | 9/1965 | Underwood . |
| 3,220,157 | 11/1965 | Buchner . |
| 3,261,533 | 7/1966 | Ripking . |
| 3,407,078 | 10/1968 | Schlichter . |
| 3,419,400 | 12/1968 | Hayhurst et al. . |
| 3,450,542 | 6/1969 | Badran . |
| 3,473,589 | 10/1969 | Gotz . |
| 3,484,017 | 12/1969 | O'Donnell . |
| 3,521,806 | 7/1970 | Esty . |

(List continued on next page.)

FOREIGN PATENT DOCUMENTS

| | | |
|---|---|---|
| 1025786 | 2/1978 | (CA) . |
| 2842204 | 4/1980 | (DE) . |
| 025334 | 1/1988 | (EP) . |
| 402436 | 12/1933 | (GB) . |
| 764796 | 1/1957 | (GB) . |
| 1378140 | 12/1974 | (GB) . |
| 60-126032 | 7/1985 | (JP) . |

OTHER PUBLICATIONS

Wiley Encyclopedia of Packaging Technology J. Wiley & Sons, 1986 ppp. 24–29, 66–81.
Packaging, Japan, Nov. 198, pp. 17–22.
Chemcial Engineering, vol. 64.
Modern Packaging, Aug. 1941, pp. 44, 45.
"The King PAK" eight sided fiberboard IBC from Packaging Review, May 1980, 1 page.
The Wiley Encyclopedia of Packaging Technology (WFPT), John Wiley & Sons, 1986, p. 493.

*Primary Examiner*—Frankie L. Stinson
(74) *Attorney, Agent, or Firm*—Patrick F. Bright

(57) ABSTRACT

Apparatus for washing a cored head of lettuce includes a lettuce head guide that fits into the cored hole of a cored lettuce head; the guide is attached to a support that has an opening through which the guide projects, and, beneath the guide, a system that delivers a wash spray into the cored hole.

6 Claims, 7 Drawing Sheets

U.S. PATENT DOCUMENTS

| | | |
|---|---|---|
| 3,715,860 | 2/1973 | Esty . |
| 3,747,614 | 7/1973 | Buedingen . |
| 3,939,287 | 2/1976 | Orwig et al. . |
| 3,945,558 | 3/1976 | Elder . |
| 3,957,179 | 5/1976 | Bamburg et al. . |
| 3,990,358 | 11/1976 | Cade . |
| 3,991,543 | 11/1976 | Shaw . |
| 4,001,443 | 1/1977 | Dave . |
| 4,006,561 | 2/1977 | Toma et al. . |
| 4,039,350 | 8/1977 | Bucy . |
| 4,055,931 | 11/1977 | Myers . |
| 4,061,785 | 12/1977 | Nishino et al. . |
| 4,066,401 | 1/1978 | Solomon . |
| 4,079,152 | 3/1978 | Bedrosian et al. . |
| 4,089,417 | 5/1978 | Osborne . |
| 4,105,153 | 8/1978 | Locke . |
| 4,168,597 | 9/1979 | Cayton . |
| 4,209,538 | 6/1980 | Woodruff . |
| 4,224,347 | 9/1980 | Woodruff . |
| 4,241,558 | 12/1980 | Gidewall et al. . |
| 4,258,848 | 3/1981 | Akao et al. . |
| 4,268,555 | 5/1981 | Kantz . |
| 4,296,860 | 10/1981 | Hsu et al. . |
| 4,343,429 | 8/1982 | Cherry . |
| 4,411,921 | 10/1983 | Woodruff . |
| 4,422,466 | 12/1983 | Schafer . |
| 4,423,080 | 12/1983 | Bedrosian et al. . |
| 4,454,945 | 6/1984 | Jabarin . |
| 4,515,266 | 5/1985 | Myers . |
| 4,516,692 | 5/1985 | Croley . |
| 4,610,885 | 9/1986 | Tait . |
| 4,670,227 | 6/1987 | Smith . |
| 4,702,408 | 10/1987 | Powlenko . |
| 4,744,199 | 5/1988 | Gannon . |
| 4,744,203 | 5/1988 | Brockwell et al. . |
| 4,756,417 | 7/1988 | Teixeira . |
| 4,759,642 | 7/1988 | Van Erden et al. . |
| 4,813,791 | 3/1989 | Cullen et al. . |
| 4,840,271 | 6/1989 | Garwood . |
| 4,863,287 | 9/1989 | Marisk . |
| 4,886,372 | 12/1989 | Greengrass et al. . |
| 4,930,906 | 6/1990 | Hemphill . |
| 4,962,777 | 10/1990 | Bell . |
| 4,963,287 | 10/1990 | Hutchings et al. . |
| 4,967,776 | 11/1990 | Folmar . |
| 5,044,776 | 9/1991 | Schramer et al. . |
| 5,078,509 | 1/1992 | Center et al. . |
| 5,093,080 | 3/1992 | Keller . |
| 5,121,589 | 6/1992 | Ventura et al. . |
| 5,226,972 | 7/1993 | Bell . |
| 5,290,580 | 3/1994 | Floyd et al. . |
| 5,316,778 | 5/1994 | Hougham . |
| 5,346,089 | 9/1994 | Brown et al. . |
| 5,354,569 | 10/1994 | Brown et al. . |
| 5,402,906 | 4/1995 | Brown et al. . |
| 5,421,250 | 6/1995 | Beaumont . |
| 5,437,731 | 8/1995 | St. Martin . |
| 5,522,410 | 6/1996 | Meilleur . |
| 5,640,643 | 6/1997 | Hoitz et al. . |
| 5,713,101 | 2/1998 | Jackson . |
| 5,727,690 | 3/1998 | Hofmeister . |
| 5,728,439 | 3/1998 | Carlblom et al. . |
| 5,885,002 | 3/1999 | Reiss . |
| 5,954,067 | 9/1999 | Brown et al. . |
| 6,041,797 | 3/2000 | Casselman . |

END ELEVATION

SIDE ELEVATION

PLAN VIEW

AIR CONTROL SCHEMATIC

APPARATUS AND METHODS FOR WASHING CORES OF CORED LETTUCE HEADS

This invention relates to an apparatus and methods for washing the cored area of a lettuce head.

These apparatus, in preferred embodiments, include a perforated platform, preferably a perforated platform, connected to and supporting a tripod, or other lettuce head guide, that fits into the core hole of a cored lettuce head, and orients the lettuce head during washing of the core hole. Preferably, the guide includes three L-shaped vanes that project upwardly from the support platform.

In preferred embodiments, a support platform includes supports for a lettuce head holder. This holder has an opening sufficiently large to permit the guide to project through the opening with the holder in a first position over the guide. The opening in the holder includes, near the top of the holder, a recess, preferably of sufficient size and shape to receive and support a cored head of lettuce. In the first position, the core hole of a lettuce head is placed over the guide and into the recess of the holder, with the lettuce head otherwise resting in the recess of the holder.

The holder is pivotally connected to two holder supports. The two holder supports are connected to the support platform so that the holder can move upwardly from the first, preferably horizontal position, where the guide projects through the opening in the holder, to a second raised position at a distance of 45° to 75° from the first position. This movement to a second position unseats the cored area of the lettuce head from the guide and propels the lettuce head onto a conveyor that carries the cored, washed lettuce head from the washing apparatus.

Below the perforated platform is a housing for a chamber that stores and dispenses aqueous, lettuce head washing solution. Inside this chamber is an inlet valve through which such a solution enters the chamber. This inlet valve is connected to a float mechanism. The inlet valve maintains a predetermined, adjustable level, usually at or near the middle of the chamber.

Inside the chamber are a screen and screen housing through which the aqueous solution exits the chamber and flows, via lines and valves, into a pressurizable chamber. At least one valve is a check valve that prevents the aqueous solution from escaping the pressurized chamber, and flowing upstream toward the screen and screen housing. Inside the pressurized chamber is a syphon, preferably of cylindrical shape, with an opening at a distal end near the bottom of the pressurizable chamber. Aqueous solution enters the syphon from this distal end, and flows, under pressure, upwardly toward a nozzle at the proximal end of the syphon. The pressurized chamber also includes an opening for admitting a pressurizing gas such as air into the chamber. In preferred embodiments, the nozzle at the proximal end of the syphon discharges a spray of aqueous solution upwardly into and through the area within the guide, and into and around the cored area of a lettuce head to wash the head efficiently.

The washing apparatus also includes pressure driven timers. These timers control the time for aqueous solution to exit the chamber and flow into the pressurizable chamber; start and stop the flow of pressurizing air or other gas into the pressurizable chamber; initiate and sustain the spray from the nozzles into the area with the guide and into the core hole of a cored lettuce head placed on the guide; control the time for ejecting the cored lettuce head; and control the time delay between one wash cycle and another.

DETAILED DESCRIPTION OF THE DRAWINGS

Figure 1:
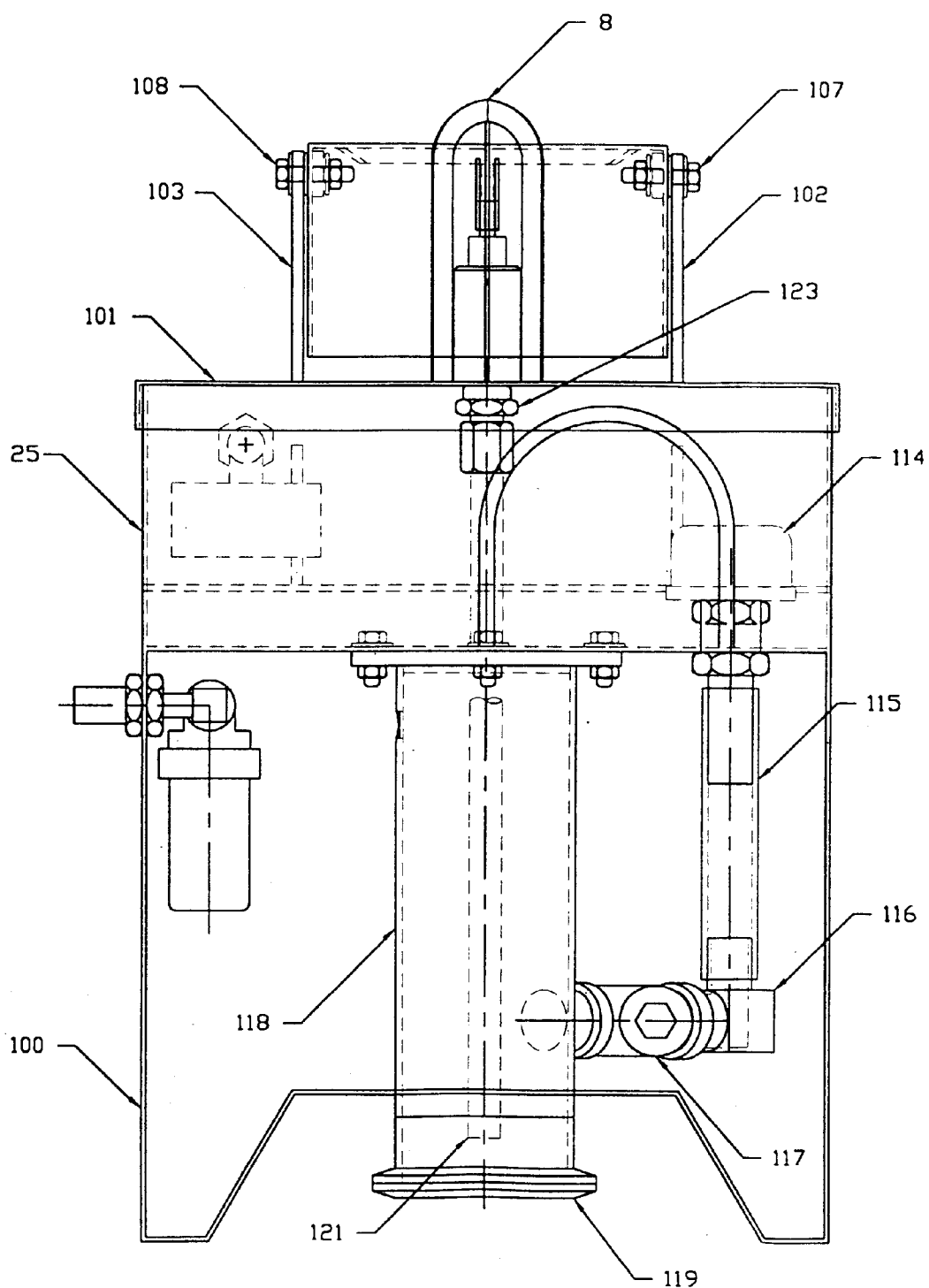
FIG. 1 shows an end elevation view in cross-section of a preferred embodiment of the cored lettuce head washing apparatus of this invention.
Figure 2:
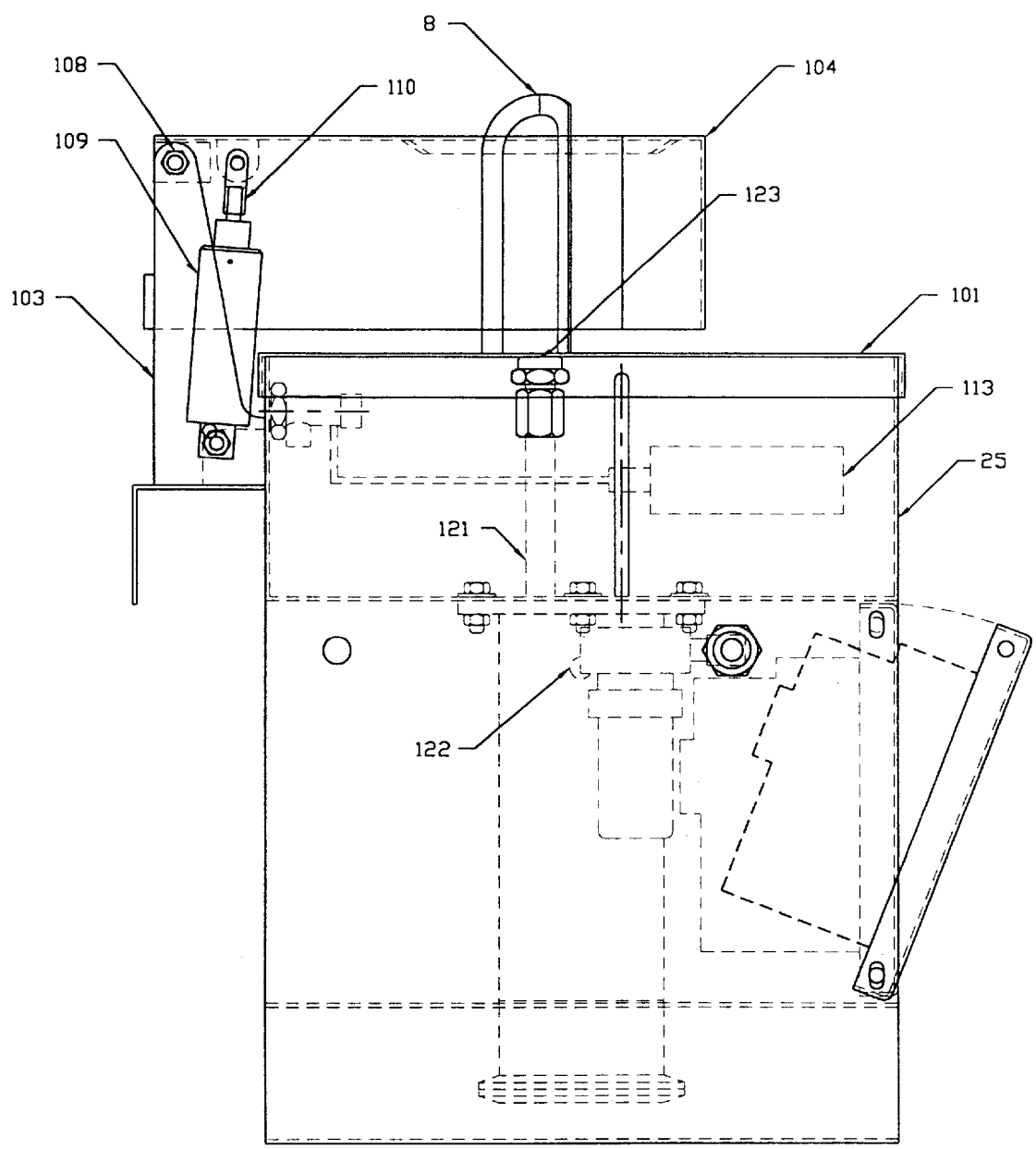
FIG. 2 is a side elevation view in cross-section of the cored lettuce head washing apparatus shown in FIG. 1.
Figure 3:
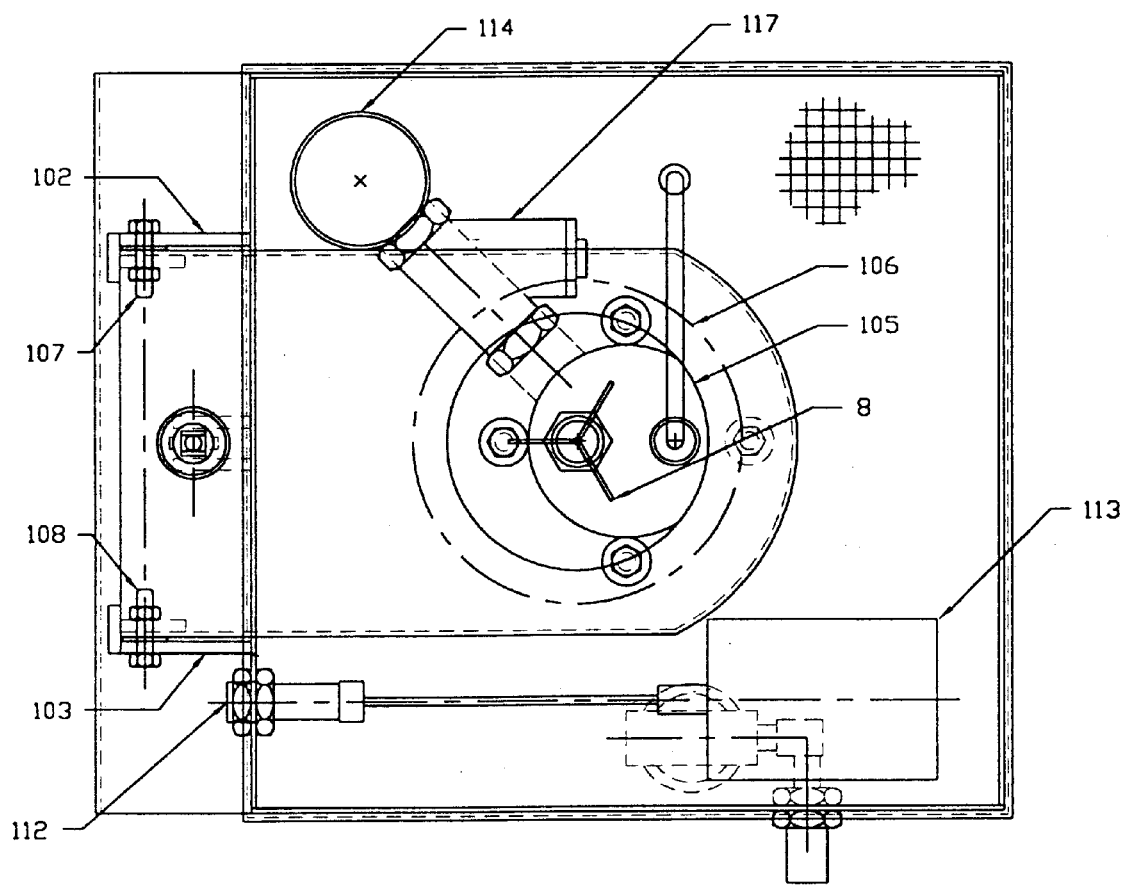
FIG. 3 is a top plan view of the cored lettuce head washing apparatus shown in FIGS. 1 and 2.

FIG. 1 shows lettuce head washing apparatus 100. Apparatus 100 includes perforated platform 101 that supports, and is connected to guide 8. Guide 8 includes three L-shaped vanes, that project upwardly from platform 101.

Also attached to washing apparatus 100 are supports 102 and 103 for platform 104. Platform 104 includes opening 105 sufficiently large in diameter to permit guide 8 to project through opening 105 with platform 104 in the horizontal position shown in FIG. 1. Opening 105 includes, near the top of platform 104, recess 106. Recess 106 is of sufficient depth and size to receive and support a cored head of lettuce when the core hole is placed over guide 8 with the balance of the lettuce head resting in recess 106.

Platform 104 connects to supports 102 and 103 with pivots 107 and 108 and is moveable upwardly from the horizontal position shown in FIG. 1 to a second position, as shown in FIG. 8. Pneumatic piston 109 is connected by rod clevis 110 to platform 104, and can move platform 104 from the position shown in FIG. 1 to the position shown in FIG. 7.

Below platform 101, and supporting platform 101, is chamber 25. Inside chamber 25 is valve 112 through which such a solution enters chamber 25. Valve 112 is connected to float mechanism 113, and opens when float 113 drops to a predetermined, adjustable level, usually at or near the middle of chamber 25. Chamber 25 also includes screen and screen housing 114. Aqueous solution in chamber 25 passes through screen housing 114, line 115, fitting 116 and check valve 117 into chamber 118. Chamber 118 includes bottom closure 119.

Inside chamber 118 is syphon 121. Chamber 118 and syphon 121 receive aqueous solution via line 115, fitting 116 and check valve 117. Pressurizing air enters chamber 118 through opening 122 via an air pressurizing line (not shown). As the air pressure increases in chamber 118, the aqueous solution in chamber 118 moves downwardly in chamber 118 and upwardly through syphon 121, and nozzle 123, then sprays upwardly into the area inside guide 8.

Figure 4:
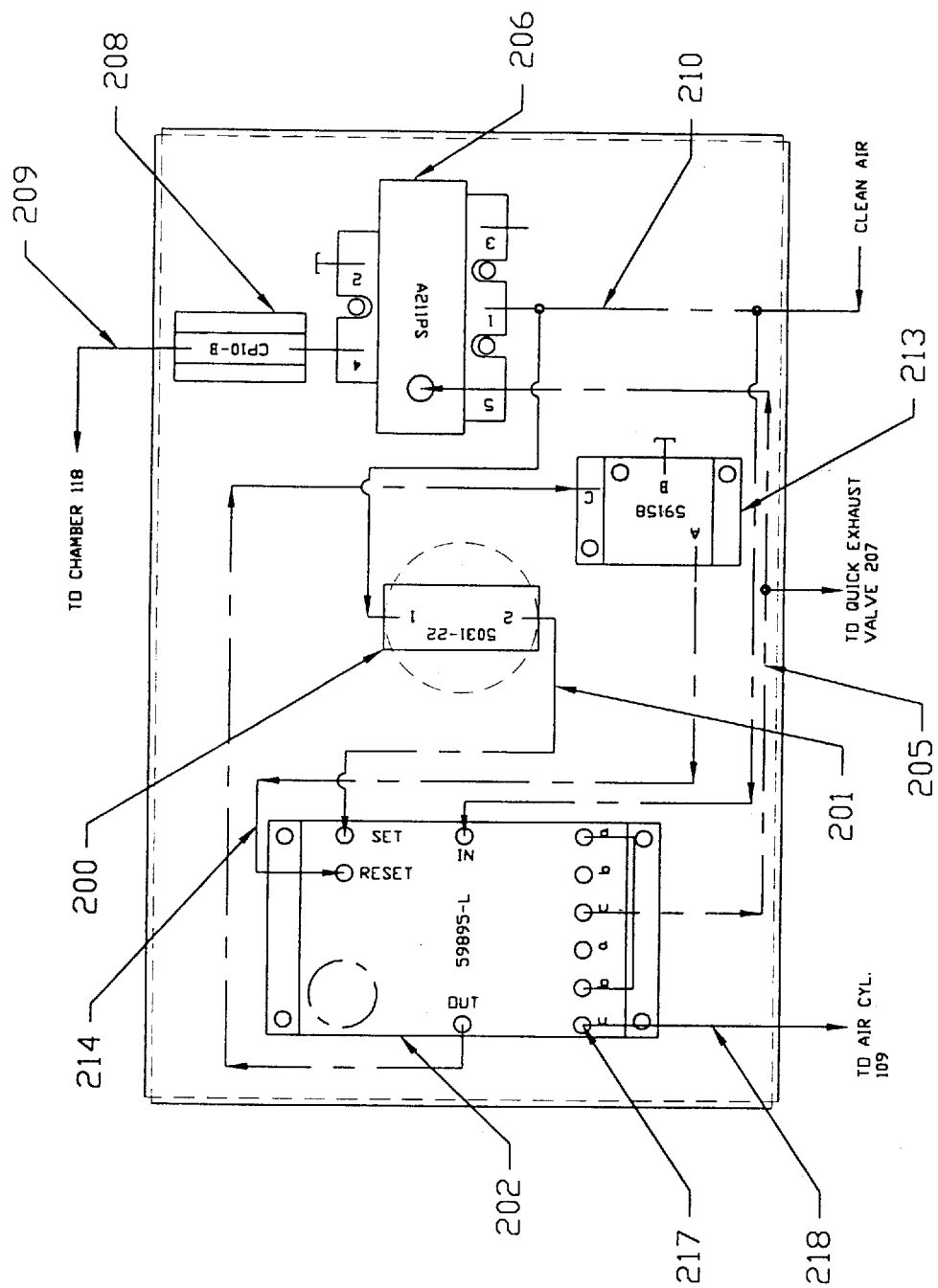
FIG. 4 is a schematic of a preferred embodiment of an air pressurizing system for the apparatus of FIGS. 1 to 3.

FIG. 4 shows a schematic of the air pressure system that operates aqueous wash apparatus 100. When a user pushes the momentary start button 400, switch 200 is activated. Switch 200 delivers an air pressure signal on line 201 to timer 202. Another air pressure signal then passes via line 205 to, and activates valve 206, and valve 207. Input Air dine 210) passes through check valve 208 and line 209 to chamber 118. After chamber 118 is pressurized, and the aqueous solution in chamber 118 is sprayed through nozzle 123 into the core hole of a cored lettuce head for a time determined by timer 202, air supply to chamber 118 ceases.

After timer 202 times out, input air pressure is delivered through regulator valve 217 via line 218 to air cylinder 109 to move platform 104, propelling a cored lettuce head onto a conveyor (not shown). After a predetermined time passes, an air pressure signal from timer 213 passes to reset timer 202 and deactivate air cylinder 109 via line 214.

Figure 5:
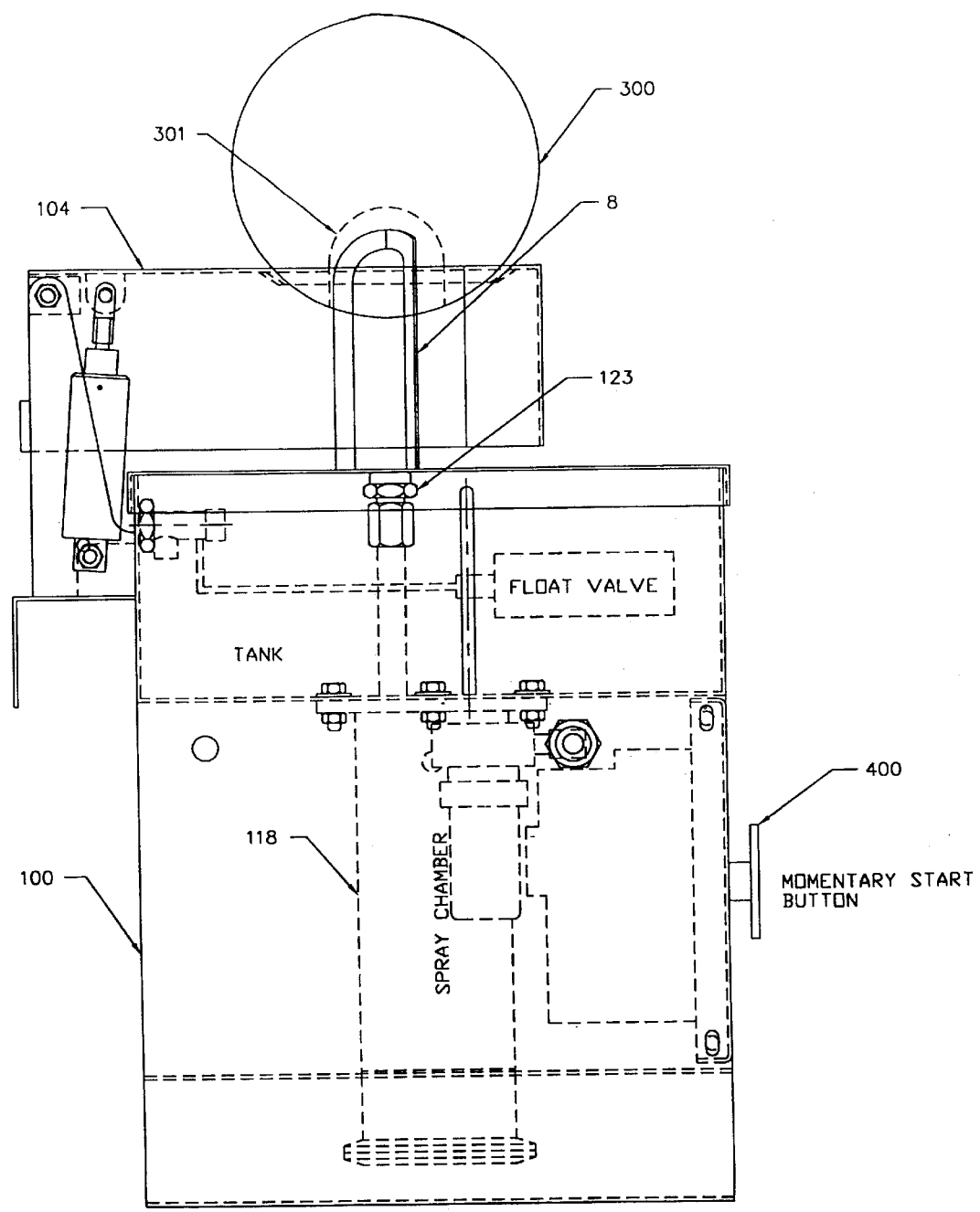
FIG. 5 shows the apparatus of FIGS. 1 through 4 with a cored lettuce head in place, ready for washing.
Figure 6:
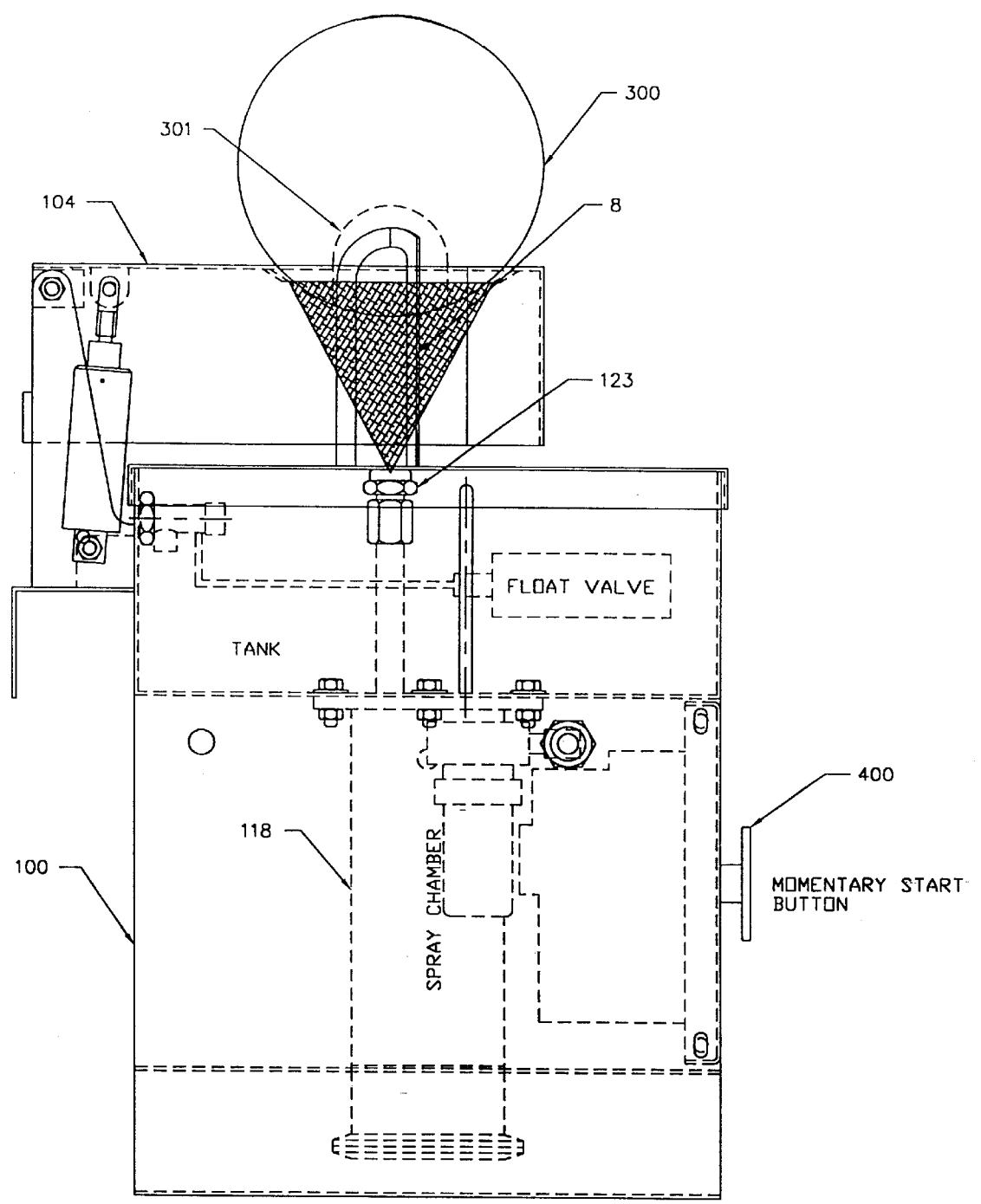
FIG. 6 shows the apparatus of FIG. 5, with an aqueous liquid washing spray passing upwardly into, and washing, the cored hole of the lettuce head shown in FIG. 5.
Figure 7:
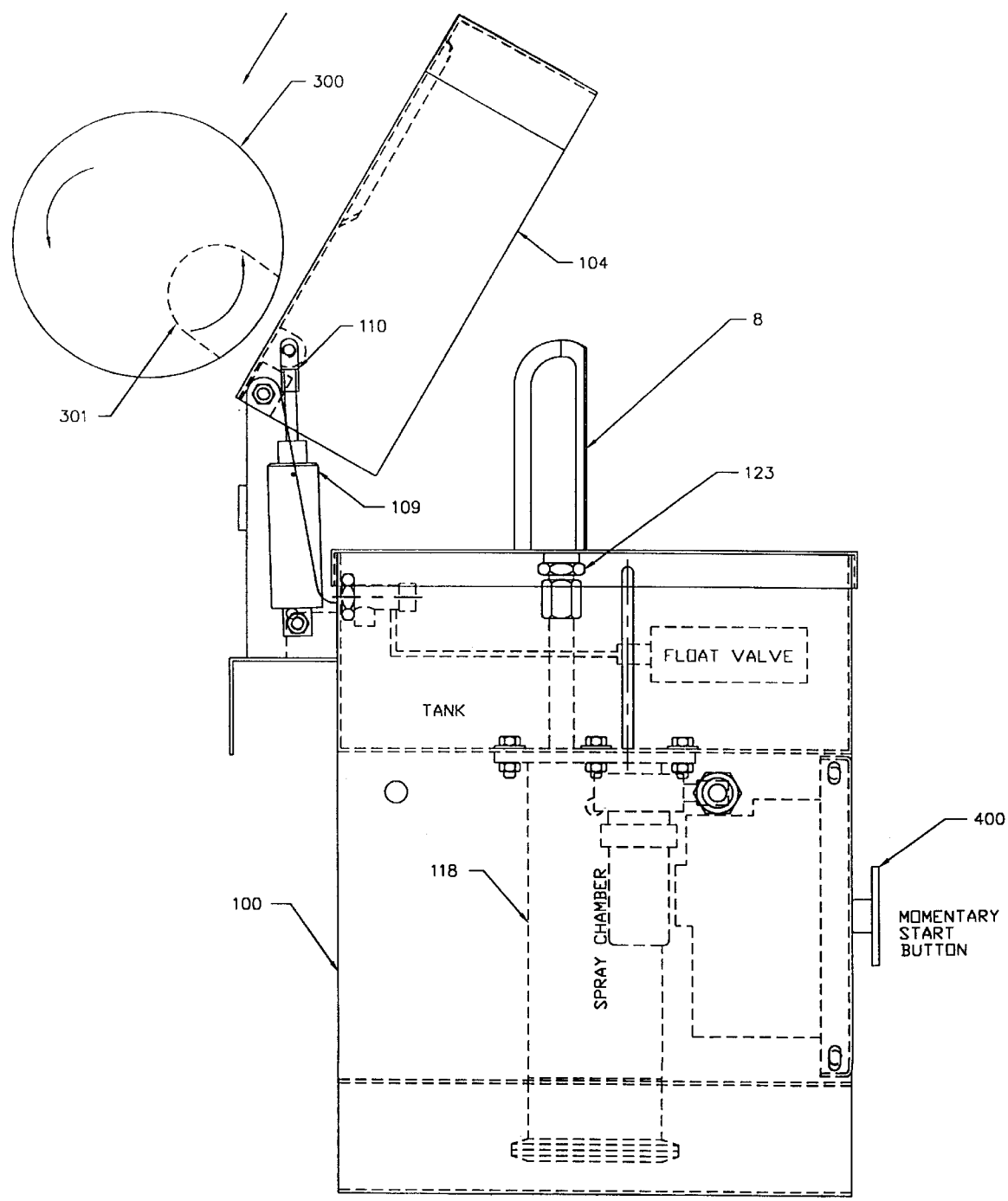
FIG. 7 shows the apparatus of FIG. 6 propelling the cored lettuce head, after washing of the core hole as shown in FIG. 6, onto a suitable conveyor (not shown).

FIGS. 5, 6 and 7 show the sequence of operations in the washing of a cored lettuce head 300 by apparatus 100. s 5 shows cored lettuce head 300 placed on guide 8 with core hole 301 atop guide 8. In FIG. 6, an aqueous solution from chamber 118 is sprayed through nozzle 123 into lettuce core hole 301. In FIG. 7, platform 104 moves upwardly as the rod clevis 110 connected to piston 109 moves upwardly to deliver lettuce head 300 onto a suitable lettuce head conveyor belt.

What is claimed is:

1. An apparatus for washing a cored head of lettuce comprising:

a lettuce head guide that fits into the core hole of a cored lettuce head, said lettuce head guide being attached to, supported by, and projecting upwardly from a perforated support platform;

a lettuce head holder pivotally connected to supports, said supports being connected to said perforated support platform, said lettuce head holder having an opening sufficiently large to permit said lettuce head guide to project through said opening with said holder in a first position over said lettuce head guide, said opening including, near the top of said holder, a recess to receive and support a cored head of lettuce, said lettuce head holder being moveable to a second raised position at a distance of about 45° to about 75° from said first position; and, beneath said support platform, an aqueous solution spraying system that delivers an aqueous spray into said core hole when said lettuce head core hole is atop said lettuce head guide.

2. The apparatus of claim 1, further comprising, beneath said support platform, a chamber for holding said aqeous solution;

a pressurizable chamber that includes, inside said pressurizable chamber, a syphon having at its proximal, a spray nozzle for spraying aqueous solution upwardly into the core hole of a cored lettuce head when said cored lettuce head is atop said lettuce head guide; and at least one line connecting said aqueous solution holding chamber to said pressurizable chamber.

3. The apparatus of claim 1 further comprising, beneath said support platform, a chamber for holding said aqueous solution;

a pressurizable chamber that includes, inside said pressurizable chamber, a syphon having at its proximal end, a spray nozzle for spraying aqueous solution upwardly into the core hole of a cored lettuce head when said cored lettuce head is atop said lettuce head guide; and at least one line connecting said aqueous solution holding chamber to said pressurizable chamber.

4. An apparatus for washing a cored head of lettuce comprising:

a lettuce head guide that fits into the core hole of a cored lettuce head, said lettuce head guide being attached to, supported by, and projecting upwardly from a support platform;

a lettuce head holder pivotally connected to supports, said supports being connected to said support platform, said lettuce head holder having an opening sufficiently large to permit said lettuce head guide to project through said opening with said holder in a first position over said lettuce head guide, said opening including, near the top of said holder, a recess to receive and support a cored head of lettuce, said lettuce head holder being moveable to a second raised position at a distance of about 45° to about 75° from said first position; and, beneath said support platform, an aqueous solution spraying system that delivers an aqueous spray into said core hole when said lettuce head core hole is atop said lettuce head guide.

5. An apparatus for washing a cored head of lettuce comprising:

an unenclosed lettuce head guide having a size and shape that fits into the cored hole of a cored lettuce head, said lettuce head guide being attached to and supported by an unenclosed support means, said unenclosed lettuce head support means beinig connected to said support means and having an opening sufficiently large to permit said lettuce head guide to project through said opening, and, beneath said lettuce head guide, a washing system that can deliver a wash spray substantially exclusively into said cored hole.

6. The apparatus of claim 5 further comprising, beneath said lettuce guide, one or more spray nozzles for spraying aqueous solution upwardly into the core of a cored lettuce head when said cored lettuce head is atop said lettuce head guide.

\* \* \* \* \*